US007030739B2

(12) United States Patent
DiCroce

(10) Patent No.: US 7,030,739 B2
(45) Date of Patent: Apr. 18, 2006

(54) VEHICLE SECURITY SYSTEM AND METHOD FOR PROGRAMMING AN ARMING DELAY

(75) Inventor: John DiCroce, Oceanside, NY (US)

(73) Assignee: Audiovox Corporation, Hauppauge, NY (US)

(*) Notice: Subject to any disclaimer, the term of this patent is extended or adjusted under 35 U.S.C. 154(b) by 3 days.

(21) Appl. No.: 10/351,923

(22) Filed: Jan. 27, 2003

(65) Prior Publication Data

US 2004/0145458 A1 Jul. 29, 2004

(51) Int. Cl.
*B60R 25/10* (2006.01)

(52) U.S. Cl. .................. 340/426.1; 340/430; 340/527; 340/528

(58) Field of Classification Search ............ 340/426.1, 340/430, 527, 528, 426.24, 426.25, 426.27, 340/426.28, 426.29
See application file for complete search history.

(56) References Cited

U.S. PATENT DOCUMENTS

| | | | | | |
|---|---|---|---|---|---|
| 4,754,255 | A | * | 6/1988 | Sanders et al. | 307/10.4 |
| 4,887,064 | A | * | 12/1989 | Drori et al. | 340/5.23 |
| 5,079,538 | A | * | 1/1992 | DeFino et al. | 340/426.17 |
| 5,543,776 | A | * | 8/1996 | L'Esperance et al. | 340/426.25 |
| 5,729,191 | A | * | 3/1998 | Allen et al. | 340/426.17 |
| 6,317,034 | B1 | * | 11/2001 | Issa et al. | 340/426.25 |
| 6,373,381 | B1 | * | 4/2002 | Wu | 340/426.28 |
| 6,480,095 | B1 | * | 11/2002 | Flick | 340/5.2 |
| 2003/0058083 | A1 | * | 3/2003 | Birchfield | 340/5.22 |

* cited by examiner

*Primary Examiner*—Daniel Wu
*Assistant Examiner*—Samuel J. Walk
(74) *Attorney, Agent, or Firm*—F. Chau & Associates, LLC

(57) ABSTRACT

A method for programming a vehicle security system comprises initiating a timed delay feature, determining a timed delay of the timed delay feature, and incorporating the timed delay into a security system event delay.

20 Claims, 5 Drawing Sheets

VEHICLE SECURITY SYSTEM AND METHOD FOR PROGRAMMING AN ARMING DELAY

BACKGROUND OF THE INVENTION

1. Field of the Invention

The present invention relates to vehicle security systems, and more particularly to a system and method for programming an arming delay.

2. Discussion of Related Art

Typically, aftermarket security systems have different chirp patterns to indicate different modes of operation. For example, when a security system is armed, a siren emits one chirp; when the security system is disarmed, the siren emits two chirps; if the security system is armed and a zone, such as a door hood or trunk, is left open, or the zone becomes defective, the siren will emit three chirps; and if an a intrusion attempt had been made, the siren will emit four chirps when disarmed. The chirp patterns are an aid to the operator when determining if the system is fully or partially operational, and if the system has been tampered with.

A problem arises with vehicles having a delayed interior light and an aftermarket security system. In the case where the security system is installed in a vehicle having an interior light circuit that cascades off or remains on for a period of time after a last door is closed, determining whether a defect is present is not possible because the interior light is detected as a defect in the arming procedure. The interior light appears to the security system as a door that has been left opened. Thus, when the security system is armed, the security system emits a fault code, e.g., a chirp indicating a defect/door ajar, when there is no problem and the vehicle is secure.

The fault code can confuse a dealer/distributor because delay lighting is not a feature in every vehicle and the chirp patterns do not necessarily chirp properly with delay lighting. Further, depending on the elapsed time between closing a last door and arming the security system, the fault code will not be consistently indicated. That is, within a delay light active period, the security system will indicate a fault code, but will indicate a normal arming if the security system is armed after the delay light active period has lapsed after the door is closed.

Other manufacturers have elected to offer a feature that allows the installer to select the security system to indicate an armed condition regardless of a defective zone, actual or otherwise, to remove the objections of the consumer and dealer/distributor. The problem with this method is that the warning feature is defeated and the vehicle can be unwittingly left unprotected.

Therefore, a need exists for a system and method for programming an arming delay.

SUMMARY OF THE INVENTION

According to an embodiment of the present invention, a method for programming a vehicle security system comprises initiating a timed delay feature, determining a timed delay of the timed delay feature, and incorporating the timed delay into a security system event delay.

The method comprises setting the security system event delay equal to or greater than the timed delay. The method comprises setting the security system event delay equal to the timed delay plus a predefined offset time.

The method further comprises initiating a learning mode. The method comprises exiting the learning mode.

According to an embodiment of the present invention, a method for programming a vehicle security system comprises initiating a timed delay, triggering a security system event, delaying the security system event for a time period greater than or equal to the timed delay, determining zone integrity of the vehicle security system upon an expiration of the time period greater than or equal to the timed delay.

The method further comprises issuing a feedback according to the determined zone integrity. The method comprises issuing a default feedback during the time period greater than or equal to the timed delay.

Triggering the security system event comprises arming the vehicle security system. Triggering the security system event comprises automatically arming the vehicle security system upon expiration of a predetermined arming time.

According to an embodiment of the present invention, a program storage device is provided, readable by machine, tangibly embodying a program of instructions executable by the machine to perform method steps for programming a vehicle security system. The method steps comprising initiating a timed delay feature, determining a timed delay of the timed delay feature, and incorporating the timed delay into a security system event delay.

The method further comprises setting the security system event delay equal to or greater than the timed delay. The method comprises setting the security system event delay equal to the timed delay plus a predefined offset time.

The method further comprising initiating a learning mode. The method comprises exiting the learning mode.

The vehicle security system is adapted to performed steps for arming, the steps for arming comprising initiating the timed delay, triggering a security system event, delaying the security system event according to the security system event delay, and determining zone integrity of the vehicle security system upon an expiration of the security system event delay.

The method comprises issuing a feedback according to the determined zone integrity. The method further comprises issuing a default feedback during the security system event delay.

Triggering the security system event comprises arming the vehicle security system. Triggering the security system event comprises automatically arming the vehicle security system upon expiration of a predetermined arming time.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

A method for programming a vehicle security system event delay is automatic and applicable for all vehicles regardless of a predefined delay time. A learning function determines a delay and incorporates the determined delay time into an arming method.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
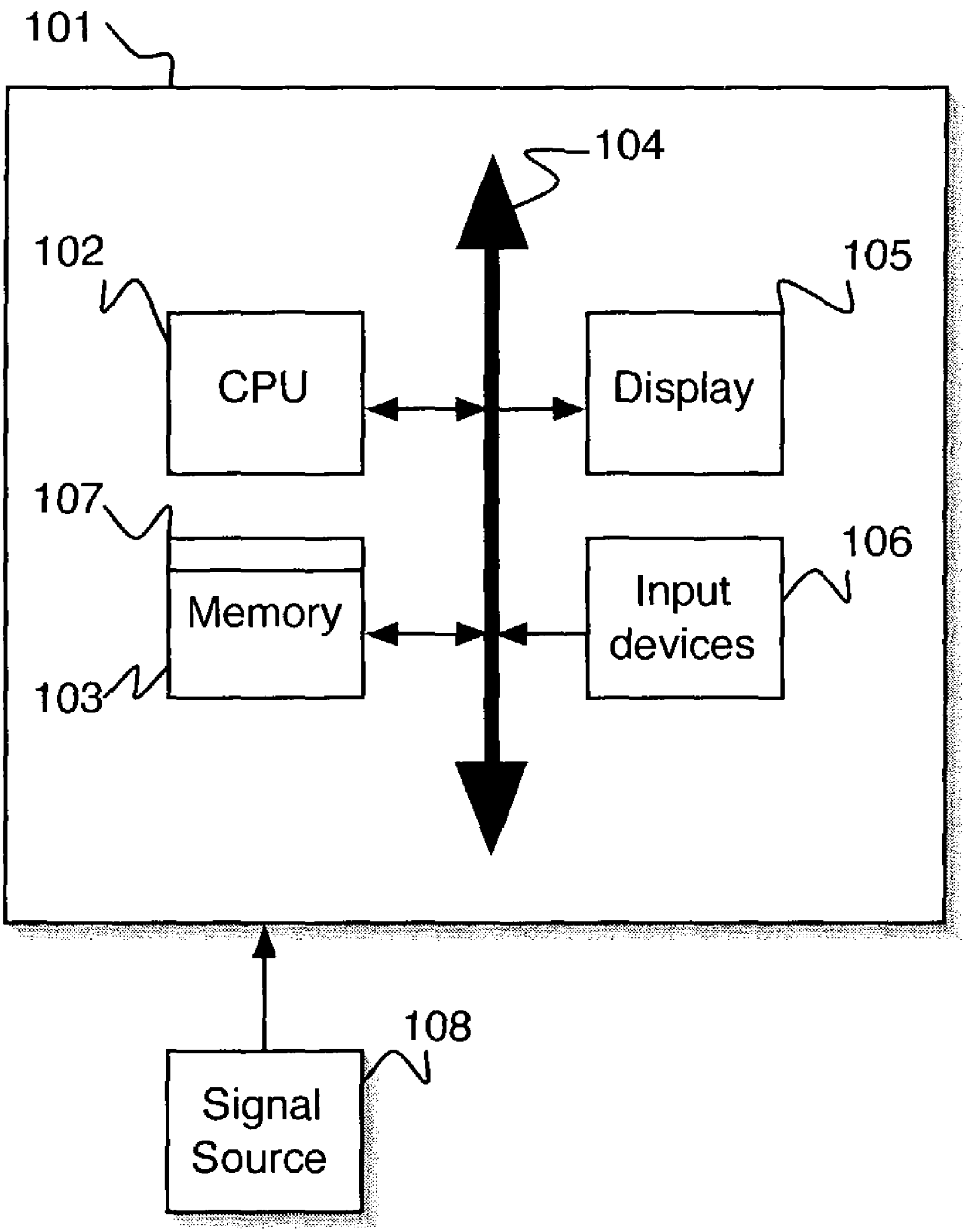
FIG. 1 is a diagram of a system according to an embodiment of the present invention.

Referring to FIG. 1, according to an embodiment of the present invention, a computer system 101 for implementing the present invention can comprise, inter alia, a central processing unit (CPU) 102, a memory 103 and an input/output (I/O) interface 104. The computer system 101 is generally coupled through the I/O interface 104 to a display 105 and various input devices 106 such as a dip switch, remote control or valet switch. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process a signal from a signal source 108, such as a vehicle's electrical system. As such, the computer system 101 is a general purpose computer system that becomes a specific purpose computer system when executing the routine 107 of the present invention.

The computer platform 101 also includes micro instruction code. The various processes and functions described herein are part of the micro instruction code.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 2:
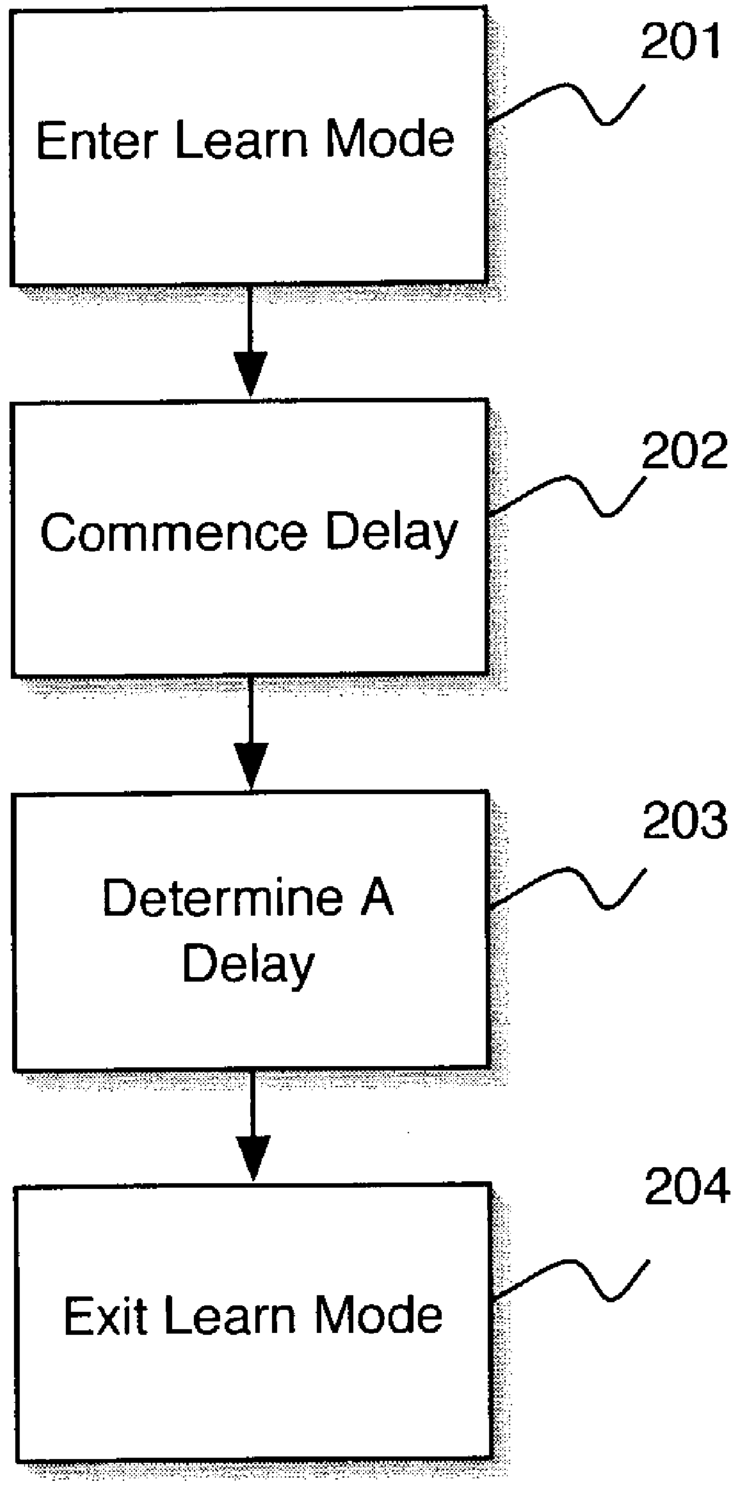
FIG. 2 is a flow chart of a learning method according to an embodiment of the present invention.

According to an embodiment of the present invention, and referring to FIG. 2, a learning mode is entered 201 and a timing delay is commenced 202. The timing delay is a predefined time period during which a system of a vehicle remains active. For example, a "follow home" feature that turns off a vehicle's headlights after a predetermined period of time, or an interior light cascade. The timing delay can be commenced upon determining that each zone of the vehicle is secure, that is, for example, all the doors are closed. While in learning mode, a delay is determined 203. Upon determining the delay, the learning mode is exited 204.

Figure 3:
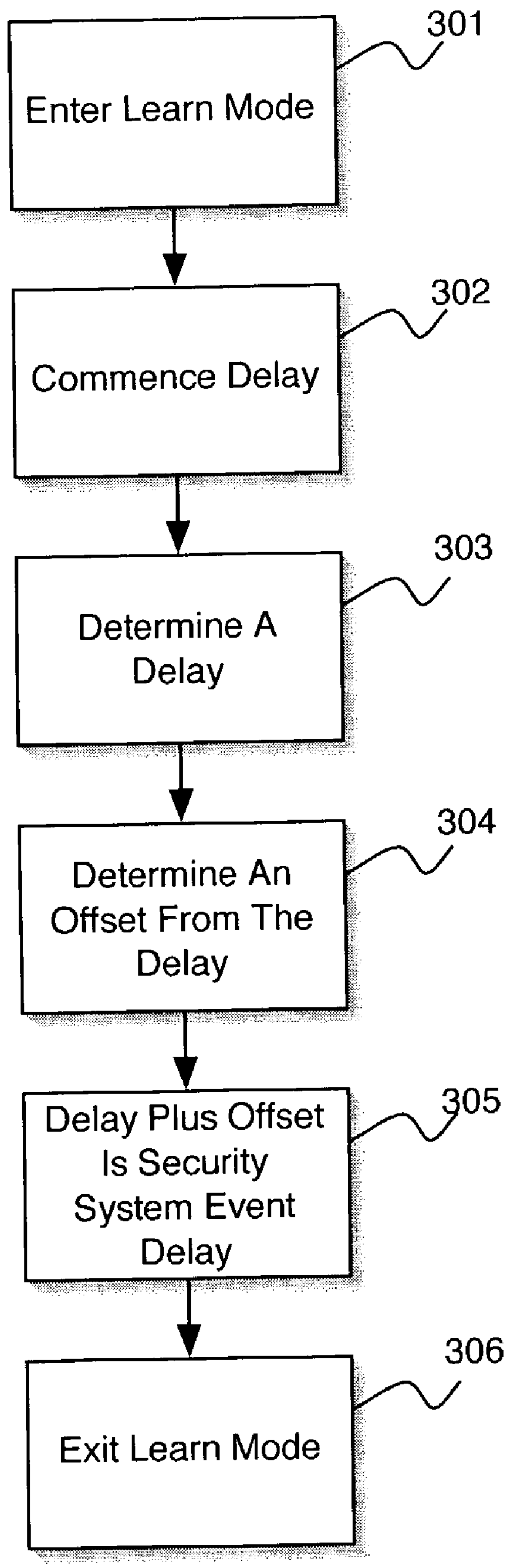
FIG. 3 is a flow chart of a learning method according to an embodiment of the present invention.

Referring now to FIG. 3, a method for programming a vehicle security system comprises entering a learning mode 301 and commencing a delay 302. The delay is determined 303 and an offset is added to the delay 304. The offset is a time period in addition to the determined delay time, such that small variations in a delay time will not cause undesirable results. A total delay time, the delay plus the offset, is stored as a security system event delay 305 and the learning mode is exited 306.

Figure 4:
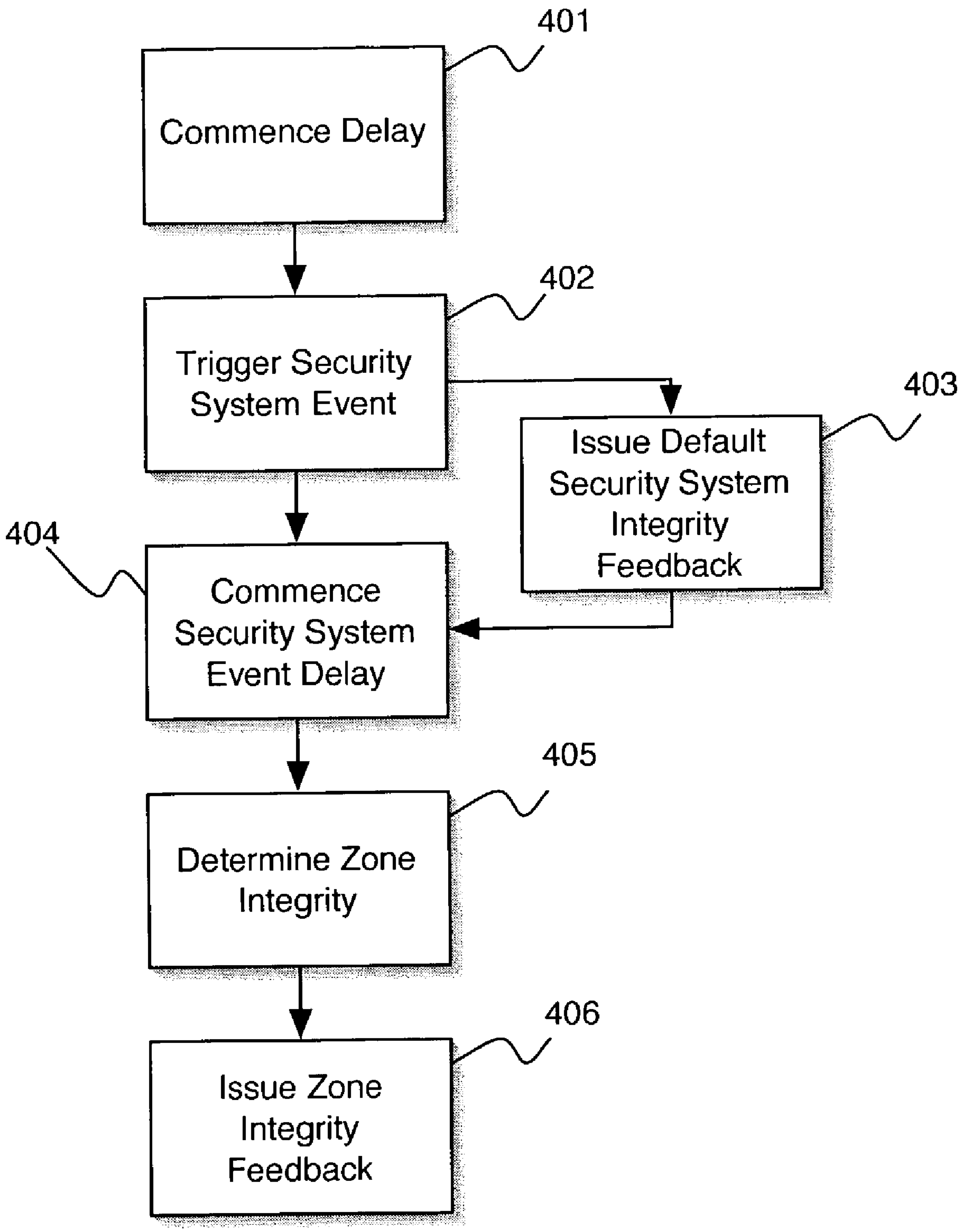
FIG. 4 is a flow chart of a method according to an embodiment of the present invention.

Referring to FIG. 4 showing an operational illustration of a method according to an embodiment of the present invention, upon commencing a delay 401 a security system event is triggered 402. The security system event can be triggered by, for example, a user selecting an "ARM" button on a remote control or by a default arming means that arms the vehicle security system after a predetermined time period. Optionally, the security system can issue a default feedback, for example, issuing one chirp. The security system event delay is commenced 404, at the end of which the zone integrity of the vehicle is determined 405. Upon determining the zone integrity of the vehicle an appropriate feedback can be issued, for example, no chirp or one additional chirp for a secure vehicle and three chirps upon determining a defect in one or more zones.

Figure 5:
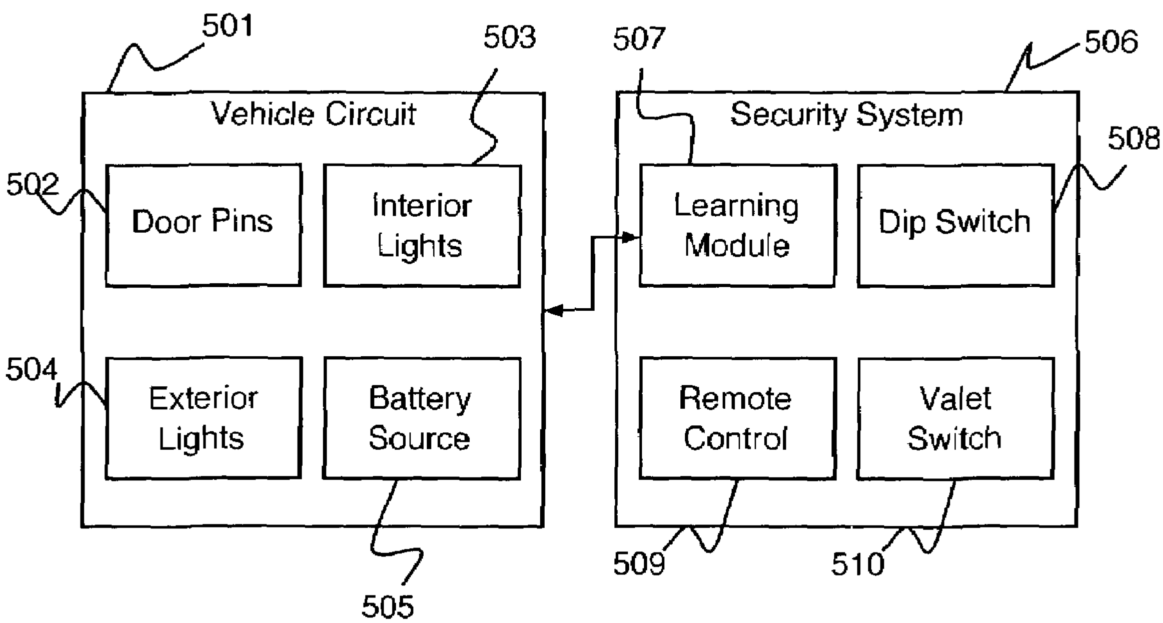
FIG. 5 is a diagram of a vehicle electrical system and a security system according to an embodiment of the present invention.

Referring to FIG. 5, according to an embodiment of the present invention, a vehicle's electrical circuit 501 is coupled to a security system 506. The vehicle's electrical circuit 501 comprises a plurality of sensors, wherein each sensor corresponds to one or more zones of the vehicle, e.g., door pins 502, interior lights 503, exterior lights 504, battery 505, etc. Thus, each sensor or signal source can be coupled to a learning module 507, comprising a voltage sensor adapted to detect voltage from the vehicle sensors. The learning module 507 can determine an appropriate security system event delay based on different inputs. For example, where a vehicle has both an interior light cascade and a follow home headlight feature.

Thus, the integrity of the security system and the chirp patterns can be maintained, and the programming is automatic and applicable for all vehicles regardless of a predefined delay time.

According to an embodiment of the present invention, a delay can be determined by a user and an appropriate security system event delay can be selected. For example, where a fifteen second delay is determined, a user can select from among a plurality of predetermined security system event delays. For example, predetermined security system event delays of ten, twenty, thirty, forty, etc. seconds can be provided. Thus, for the determined delay period of fifteen seconds, the user can select a desired security system event delay, e.g., a time period greater than fifteen seconds. The selection of the security system event delay can be made through software, hardware, or a combination of both. A preferred embodiment of a hardware-based solution comprises dip switches 508 (shown in FIG. 5). For example, in a system comprising three dip switches 508, each dip switch having one of two positions, one of eight different delays can be selected, e.g., zero, five, ten, fifteen, twenty, thirty, forty, sixty seconds. Another preferred embodiment comprises a software solution, wherein a selection of a button on a remote control 509 (shown in FIG. 5) sets a security system event delay to one of a plurality of predetermined security system event delays stored in a memory device coupled to the security system. For example, while in a learning mode, a user can manually select a predetermined button a number of times, each subsequent selection incrementing through a list of predetermined delays. That is, for example, a first selection relates to a zero second security system event delay, a second selection relates to a five second security system event delay, a third selection relates to a ten second security system event delay, etc. Upon exiting the learning mode a final selection is stored as the security system event delay. Additional systems and methods of programming the vehicle security system would be obvious to one or ordinary skill in the art in view of the present disclosure, for example, programming the vehicle security system via software for recognizing different codes input using a valet switch 510.

Having described embodiments for a method of programming a delay function in a vehicle security system, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for programming a vehicle security system comprising the steps of:

initiating a timed delay feature when at least one zone of the vehicle security system is secure;

determining a timed delay of the timed delay feature; and incorporating the timed delay into a security system event delay.

2. The method of claim 1, further comprising setting the security system event delay equal to or greater than the timed delay.

3. The method of claim 1, further comprising setting the security system event delay equal to the timed delay plus a predefined offset time.

4. The method of claim 1, further comprising initiating a learning mode.

5. The method of claim 4, further comprising exiting the learning mode.

6. The method of claim 1, further comprising:

initiating the timed delay;

triggering a security system event;

delaying the security system event for a time period greater than or equal to the timed delay; and determining zone integrity of the vehicle security system upon an expiration of the time period greater than or equal to the timed delay.

7. The method of claim 6, further comprising issuing a feedback according to the determined zone integrity.

8. The method of claim 6, further comprising issuing a default feedback during the time period greater than or equal to the timed delay.

9. The method of claim 6, wherein the step of triggering the security system event comprises arming the vehicle security system upon expiration of an arming time.

10. A program storage device readable by machine, tangibly embodying a program of instructions executable by the machine to perform method steps for programming a vehicle security system, the method steps comprising:

initiating a timed delay feature when at least one zone of the vehicle security system is secure;

determining a timed delay of the timed delay feature; and incorporating the timed delay into a security system event delay.

11. The method of claim 10, further comprising setting the security system event delay equal to or greater than the timed delay.

12. The method of claim 10, further comprising setting the security system event delay equal to the timed delay plus a predefined offset time.

13. The method of claim 10, further comprising initiating a learning mode.

14. The method of claim 13, further comprising exiting the learning mode.

15. The method of claim 10, further comprising:

initiating the timed delay;

triggering a security system event;

delaying the security system event according to the security system event delay; and determining zone integrity of the vehicle security system upon an expiration of the security system event delay.

16. The method of claim 15, further comprising issuing a feedback according to the determined zone integrity.

17. The method of claim 15, further comprising issuing a default feedback during the security system event delay.

18. The method of claim 10, wherein the step of triggering the security system event comprises arming the vehicle security system upon expiration of an arming time.

19. The method of claim 6, wherein the step of triggering the security system event comprises arming the vehicle security system.

20. The method of claim 15, wherein the step of triggering the security system event comprises arming the vehicle security system.

* * * * *